United States Patent [19]
Gwyn, Jr.

[11] 3,737,999
[45] June 12, 1973

[54] METHOD FOR MAKING COLD BONDED ELECTRICAL COMPOSITE CONTACTS

[75] Inventor: Childress B. Gwyn, Jr., Wethersfield, Conn.

[73] Assignee: Contacts Incorporated, Wethersfield, Conn.

[22] Filed: Aug. 12, 1970

[21] Appl. No.: 63,333

Related U.S. Application Data

[62] Division of Ser. No. 641,342, May 25, 1967, Pat. No. 3,547,334

[52] U.S. Cl. .............................................. 29/630
[51] Int. Cl. .................................................. H01r
[58] Field of Search ....................... 10/27; 29/630 C

[56] References Cited
UNITED STATES PATENTS

| | | | |
|---|---|---|---|
| 3,371,414 | 3/1968 | Gwyn, Jr. | 29/630 C |
| 3,397,454 | 8/1968 | Gwyn, Jr. | 20/630 C |
| 3,427,716 | 2/1969 | Renz | 29/630 C |

FOREIGN PATENTS OR APPLICATIONS

| | | | |
|---|---|---|---|
| 910,929 | 11/1962 | Great Britain | 29/630 C |

Primary Examiner—Charles W. Lanham
Assistant Examiner—James R. Duzan
Attorney—Marn & Jangarathis

[57] ABSTRACT

This invention relates to a novel method for forming composite electrical contact elements and, more particularly, to a method for the manufacture of integrally bonded contacts, each comprising a contact working face and a contact body portion, in a rotating mechanism. The two components to be bonded are aligned in end-to-end abutting relation within a first rotating assembly and, preferably within 0.01 to 0.5 seconds after shearing such components from their wire or stock material, are transferred to a second rotating assembly and subjected to a forming blow of sufficient intensity to produce interfacial molecular bonding therebetween. Subsequent heading blows in the second assembly finally shape the contact and improve the bond. The preferred apparatus of the invention is capable of producing in excess of six hundred of such contacts per minute.

10 Claims, 13 Drawing Figures

Fig. 7
Fig. 8
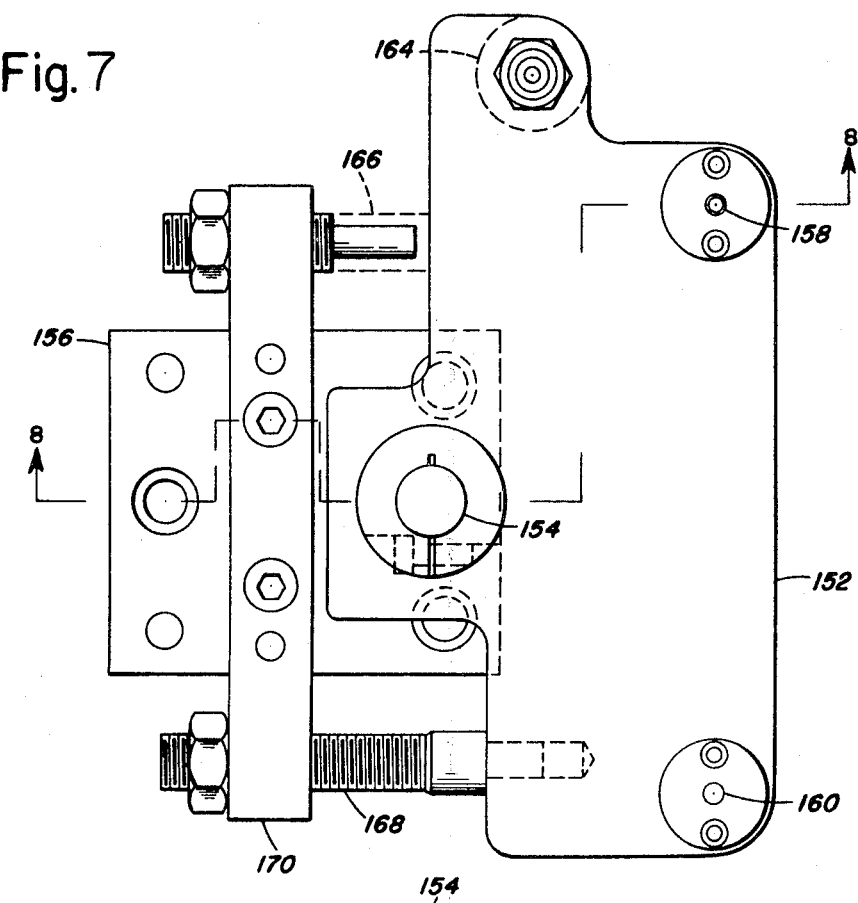
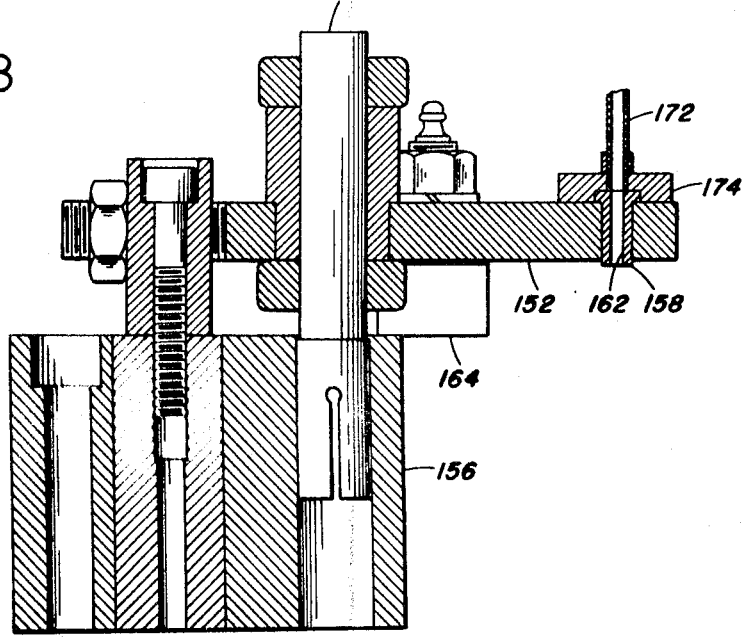

METHOD FOR MAKING COLD BONDED ELECTRICAL COMPOSITE CONTACTS

CROSS REFERENCE TO RELATED APPLICATIONS

This application is a division of copending application Ser. No. 641,342, filed May 25, 1967, now U.S. Pat. No. 3,547,334 issued Dec. 15, 1970.

BACKGROUND OF THE INVENTION

Many methods have previously been proposed for the manufacture of composite electrical contact elements. The earliest of such proposals involved relatively complex operations such as brazing, welding, puddling, or the like, and required sequential manipulation of several components for each composite contact element to be manufactured, e.g., a silver contact face component, a steel or copper contact body component, and a suitable soldering or brazing medium. Such procedures also generally required additional operations for finishing and sizing the composite contact formed to meet dimensional specifications. Frequently, electro-plating was also required. Illustrative of such earlier procedures are those disclosed in my prior U.S. Pat. Nos. 2,049,771 and 2,199,241.

More recently, several procedures for forming composite contact elements by cold heading operations have been described in the literature. One such method, disclosed in Cooney U. S. Pat. No. 2,739,369 granted on Mar. 27, 1956, involves the cold heading of components which may, for example, be in the form of wire elements, within an open die. Two pairs of such elements are subjected to a single forming blow, employing the respective pairs as anvils for mutual expansion of the individual elements of the opposing pair of elements, the individual elements thereby bonding to one another at a number of individual metallically bonded spots. Commercial practice has indicated, however, that employing the Cooney procedure, composite contact elements having contact working face portions greater than about 0.015 inch in thickness cannot readily be produced, and such composite elements as may be produced in large-scale operations do not possess substantially uniform face-portion thicknesses.

Another procedure for cold bonding the working face and body portions of a composite electrical contact is disclosed in Zysk et al. U. S. Pat. No. 3,026,603. The Zysk et al. patent describes a method for bonding a contact base metal wire section, which has previously been cleaned to remove surface contaminants, to a precious metal contact face slug, which is initially confined to present a free end engaging the wire section. The patent teaches applying upsetting pressure axially of the pair of components while simultaneously progressively releasing the precious metal slug from confinement to expand the abutting ends of the components into an open die cavity.

The known methods of manufacturing composite contacts by cold forming, including those of Cooney and Zysk, all require a thorough cleaning of at least one, and preferably each of the components to be bonded. This cleaning is required so as to remove adsorbed gas molecules on the surface of the component to be bonded, as well as any gross contaminants or oxides which may also have been formed thereon. Often, however, the cleaning is not sufficient to render the component surface sufficiently nascent to achieve a satisfactory bond. The resulting contacts, therefore, do not possess sufficient shear strength to permit prolonged operation when subjected to the mechanical and electrical stresses accompanying use.

A metal surface is most nascent immediately after being sheared from stock. Accordingly, if components can be cold bonded immediately after shearing from stock, the incidence of adsorption and oxidation on the bonding surface will be minimized, and there can be achieved a metallurgical or molecular bond of exceptionally high shear strength.

The cold bonding of abutting elements without prior cleaning and immediately after shearing from stock material has been suggested in a patent to Rozmus, U. S. Pat. No. 3,106,013. This patent, however, relates to a procedure in which a pair of such elements is bonded within an open die cavity, the bonding being limited to the extent of the projections of the respective elements into such cavity, and being accompanied by the formation of flash material peripherally of the cold bonded work pieces. Such flash material must thereafter by removed from the butt welded assembly. Thus, in Rozmus, initial cleaning is avoided by repeating the metal upsetting process until all of the contaminated material is caused to flow out of the weld area. The primary difficulties with this method are that repeated upsetting for each product unit is not conducive to automated production, and there is material wastage which otherwise would not be required.

The inappropriateness of the Rozmus method for adaptation to automated production is typical of the difficulties which have been encountered in attempting to manufacture composite bonded electrical make-and-break contacts by means of cold bonding and/or electrical welding. Maximum economy requires a satisfactory method to provide for feeding the contact components from continuous wire materials, accurately cutting of shearing segments of pre-selected lengths from such wires, positioning the segments, integrally cold bonding or welding the same together, and simultaneously or subsequently shaping the composite element to the required dimensions.

These problems are to a certain extent eliminated in my prior art, but more recent U. S. Pat. No. 3,311,965, wherein a header assembly is proposed including a feed die disposed adjacent a shear plane which includes two longitudinally extending wire feed passages for feeding the two wire stock materials into a single passage in a cutter bar. At the first wire feed passage, the cutter bar receives a predetermined amount of contact face material and, being pivotally mounted, shears this off in a first movement, which brings it to the second feed passage. It there receives a predetermined amount of contact body material, and this is sheared from the stock by a second movement. The latter movement brings the passage in the cutter bar into registration with a forming die, and a blow from a hammer pin pushes the wire segments into the forming die and delivers a coning blow which partially forms and partially bonds the segments in the forming die. The cutter bar then returns to the first position to receive additional face-forming material, and an additional blow is imparted to the partially formed contact by a punch. The finished contact is then ejected by a moveable element in the shank portion of the forming die.

The operation of this assembly is sufficiently fast to provide nascent surfaces which form good metallurgical bonds without special cleaning procedures and without flash formation which must be trimmed at a later stage. However, the operation of such a device is not without difficulties and limitations. For example, a machine built to fabricate bi-metallic contacts could only with great difficulty be adapted to produce tri-metallic contacts. Further, there is no way of controlling the coned contact shape. More important, the contact face to shank diameter ratio which can be produced in such a machine is severely limited, as is the shank length to face thickness ratio. Most important, however, is the fact that any reciprocating assembly, such as that described above, can only handle one contact at a time, and the rate at which it can operate is thus limited.

OBJECTS OF THE INVENTION

It is an object of the present invention, therefore, to provide an improved and economic method for forming composite electrical contact elements by a cold bonding process, which method is suitable for high volume production.

Yet another object of the invention is to provide a cold bonding method which results in the formation of composite contact elements exhibiting markedly greater shear strengths and having face portions of substantially uniform thickness, as compared with composite contact elements produced by heretofore known cold heading procedures.

A still further object of the invention is to provide a method for rapidly and efficiently forming composite contact elements with a minimum of manual manipulations.

An additional object of the present invention is to provide an improved method for the automatic high-speed sequential production of composite electrical make-and-break contact elements, in which thickness and length ratios are not limited as in prior art devices.

Yet an additional object of the present invention is to provide a relatively simple method and apparatus for forming composite electrical contact elements, which does not suffer from the inherent limitations of a reciprocating device.

Various other objects and advantages of the invention will become clear from the following description of the method and apparatus of the invention, and the novel features will be particularly pointed out in connection with the appended claims.

SUMMARY OF THE INVENTION

In essence, the method of the invention involves the steps rapidly shearing the desired number of segments from wire stock in end-to-end relation in a wire-receiving bore, rapidly moving the cut segments into a die cavity and delivering thereto a first coning blow to partially bond and form the contact, and thereafter delivering at least two heading blows to complete the bond and form the contact to the desired configuration. These steps are basically similar to those described in my aforementioned U.S. Pat. No. 3,311,965, except that there is herein no limit on the number of wire segments employed, and the number of heading blows is at least two, rather than one. However, in the present invention, the steps are carried out in a substantially different manner, in a fundamentally different kind of machine. In a preferred embodiment of the invention, moreover, the initial coning blow is in fact a double blow, which has substantial advantages. As a result of these improvements, a much broader variety of contacts can be produced and production rates are substantially improved.

Composite electrical contact elements exhibiting superior shear strengths and including integral contact body and working face portions, which face portions have substantially uniform thicknesses, are produced by progressively shearing longitudinally elongated components for forming the contact working face and major body portions respectively, of each such element from stock material, e.g., wire stock; aligning the two components in end-to-end, abutting relation; and, preferably within no more than about 0.2 seconds after shearing the components from stock, imparting a first forming or coning blow endwise thereof to apply an axial pressure to the abutting components and thereby expand the components adjacent their interface at least about 1.5 times the initial diameter of each such component, effecting initial interfacial molecular bonding therebetween. The thus initially bonded members are then subjected to at least two and preferably several additional forming or heading blows endwise thereof to apply a further axial pressure thereto, the continued pressures simultaneously effecting expansion of the abutting, initially bonded ends of the contact body and face portion components into the ultimate shape of the desired composite contact. The resulting element is thereafter removed from the die in which it is finally formed and, in the machine hereinafter described, the sequential shearing and forming operations can be rapidly repeated to produce 600 or more composite contact elements per minute.

It has been found that, by subjecting the abutting contact components to two or three forming or heading blows of the indicated magnitude within a very short period after shearing the same from stock material, viz., within no more than about one second and preferably from about 0.01 to 0.5 second, markedly superior composite contact elements may be produced than heretofore obtained by cold heading and/or bonding operations. Moreover, the present method may be carried out without initially cleaning the component members to be bonded, and without producing any flash or other waste material which must be removed from the composite element produced. The initial and subsequent forming blows should exert at least 1 ton per square inch pressure on the workpieces, and preferably 20 – 150 tons per square inch.

The method of the invention has been found useful in the manufacture of both composite rivet and screw contacts, in a wide range of sizes. Rivet contacts produced employing the method of the present invention may, for example, have shanks varying from about 0.020 to 0.312 inch in diameter and heads varying from about 0.030 to 1.00 inch in diameter. Moreover, the rivet heads thus produced may vary from about 0.02 to 0.156 inch in thickness and may include facing portions having substantially uniform thicknesses varying from about 0.005 inch to 75 percent of the overall head thickness, preferably from about 0.005 to 0.125 inch. In contrast thereto, commercially available composite rivet contacts produced in accordance with the methods described in the aforesaid Zysk et al. and Cooney patents have only been produced in sizes having head diameters of 0.156 to 0.250 inch, head thickness of 0.030 to 0.045 inch, shank diameters of 0.070 to 0.093 inch, and facing metal thicknesses varying only from 0.006 to 0.015 inch.

The working face of the composite contacts produced in accordance herewith is desirably sheared from a precious or semi-precious ductile stock material, e.g., wire stock. Such component may, as known in the art, be constituted of gold, silver, platinum or palladium, alloys of gold, silver, platinum, palladium, ruthenium or iridium, or ductile mixtures of such materials in admixture with, for example, one or more of the following: nickel, cobalt, copper, carbon, iron, lead, zinc, cadmium, cadmium oxide, tungsten, molybdenum or rhenium. The last named mixtures should have ductilities ranging from about 25,000 to 85,000, preferably from 30,000 to 60,000 psi. Mixtures so useful include, for example, 85 percent silver — 15 percent nickel, 90 percent silver — 10 percent iron, 97 percent silver — 3 percent carbon, 88 percent silver — 12 percent cadmium oxide, and 75 percent silver — 25 percent tungsten.

The component which, in accordance with the invention, is cold bonded automatically to form the body portion of each of the desired composite contact elements is, like the first mentioned component desirably in the form of a wire element. Such component may be constituted of any suitable ductile contact body material such as copper, a copper alloy, nickel, iron, an iron alloy or aluminum. Preferably, copper and copper alloys, e.g., commercial bronze (90 percent copper — 10 percent zinc), naval brass or any of the more commonly known "high" brasses containing more than 50 percent copper, are so utilized.

The two components to be bonded are aligned in end-to-end abutting relation and, within no more than about one second and preferably from about 0.01 to 0.5 second, after shearing such components from wire or other stock material, are subjected to a first forming blow sufficient to produce interfacial molecular bonding therebetween. It has been found that components thus bonded need not be cleaned prior to cold heading and will, nevertheless, with two or three additional forming blows, be integrated into a single composite contact element possessing shear strengths greater than heretofore obtained by cold heading of wire slugs which have been separately manipulated and/or cleaned prior to cold heading, or which have been subjected to only a single forming or heading blow.

The first forming blow is applied endwise of the abutting contact components and is of sufficient magnitude to impart an axial pressure of at least 1 ton per square inch, and preferably from about 20 to 150 tons per square inch, to the respective components. The pressure effects simultaneous expansion of the abutting ends of the pair of components to at least 1.5 and up to as much as 10 times the initial diameter of each such component. Preferably, the magnitude of the first forming blow and the dimensions of the forming die in which mutual expansion of the abutting ends of the contact components is effected are so regulated that the components are expanded from about 2 to 4 times their initial diameter to produce an integral expanded interface therebetween.

Further, in accordance with the invention, the bonded element thus produced is subjected to at least two additional forming blows to conform the composite element to the shape of the closed forming die defining the shape of the desired composite contact element. Surprisingly, the use of at least two further forming blows has been found to produce a more than five-fold increase in the shear strength of the resulting composite element, as compared with elements produced employing only a single forming blow as described hereinabove. Moreover, it has been found that the use of an additional forming blow or blows produces markedly more uniform contact working face thicknesses than can be provided employing only a single forming blow as aforesaid.

The apparatus of the invention comprises, generally, a rotating wire holder having a plurality of wire-receiving bores (referred to hereinafter as a revolving cutoff die holder and as the upper dial plate) and a rotating header die having a plurality of die cavities (also referred to as the lower dial plate), these two rotating members having a single common position where, with each increment of rotation, a wire-receiving bore is in axial registration with a die cavity. These two members are each driven by an indexing drive, and are mounted on the bed of a high speed press. Wire feed and punch elements are fixedly mounted on the reciprocating ram of the press.

With each stroke of the ram, the following operations all take place in a preferred embodiment: (1) a segment of contact body metal is fed into one wire receiving bore and sheared off; (2) a segment of contact face metal is fed into a second wire receiving bore, on top of a previously-cut segment of contact body metal, and is sheared off: (3) in a third wire receiving bore, a hammer pushes two previously-cut wire segments into a die cavity and administers a double coning blow: (4) heading blows are delivered to partially formed contacts in at least two die cavities; and (5) a finished contact is ejected from another die cavity. Between ram strokes the indexing drives move the rotating wire holder and the rotating header die a fixed increment, advancing each wire-receiving bore and each die cavity to the next step of the process.

THE DRAWINGS

A more complete understanding of the method and apparatus of the present invention may be had from the following detailed description thereof when considered in conjunction with the accompanying drawings, wherein:

FIG. 1 is a cross-sectional, schematic elevation illustrating the steps of the method of the present invention;

FIGS. 2A – C are cross-sectional elevations of three composite contacts after the initial coning step of the invention;

FIG. 7 is a plan view of the shear assembly of a preferred embodiment of the invention;

FIG. 8 is a cross-sectional elevation taken along line 8—8 of FIG. 7;

DESCRIPTION OF EMBODIMENTS

Figure 1:
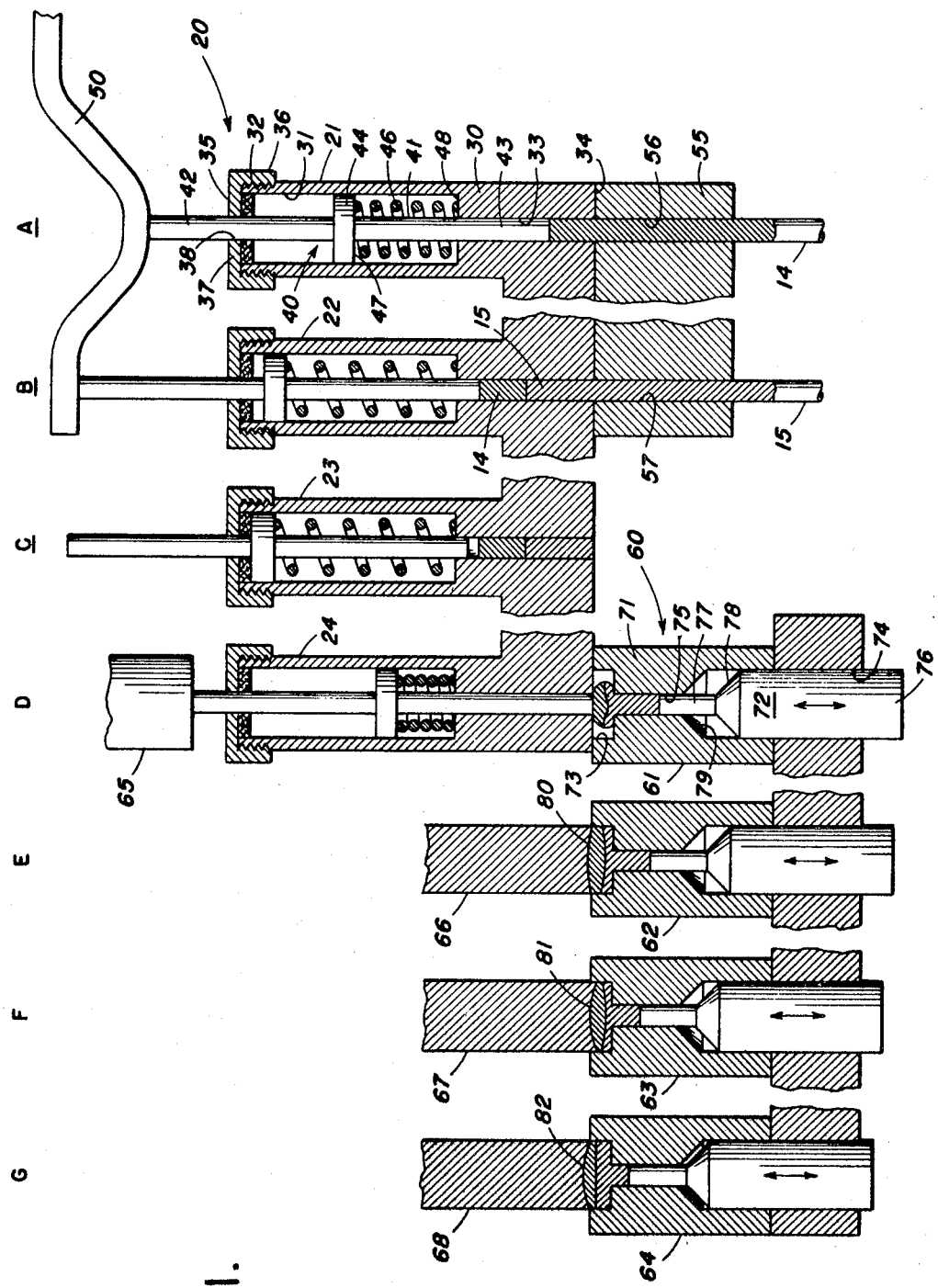

FIG. 1 shows the several steps of the method of an embodiment of the present invention sequentially, progressing from right to left, the consecutive steps being generally designated stations A through G inclusive.

As is shown in FIG. 1, a cut-off die is designated generally by the numeral 20 and is one of four identical cut-off dies mounted in a revolving die holder (not shown in FIG. 1). Cut-off die 20 has four material working stations 21, 22, 23 and 24, corresponding to method steps A, B, C and D respectively. Movement of cut-off die 20 from working stations 21 through 24 and then back to station 21 corresponds to a complete rotation of the revolving die holder in which the cut-off dies are mounted. The relationship of the cut-off die structure to the overall contact forming apparatus which can perform the method of the present invention will be discussed in detail hereinafter.

The cut-off die 20, as shown for purposes of illustration, comprises a generally cylindrical member 30 having a first bore 31 extending axially from one end 32 substantially half the length of member 30, and a second bore 33, smaller than bore 31, and extending axially from the other end 34 of member 30 to bore 31. The one end 32 of member 30 is provided with external screw threads for receiving a cap 35 thereon. Cap 35 has a cylindrical wall portion 36 and one end wall portion 37. The inner surface of cylindrical wall portion 36 is threaded for engagement with the threaded end 32 of member 30. Further, end wall portion 37 of cap 35 is provided with a centrally disposed, longitudinally extending hole 38 for receiving a cam follower shaft as will be hereinafter described.

A material positioning member 40 is located within the cylindrical member 30. The material positioning member 40 generally comprises a cylindrical shaft 41 having a cam follower end 42, a material positioning end 43, and a piston 44 mounted substantially centrally on shaft 41 separating the material positioning end 43 from the cam follower end 42.

Piston 44 is of such a diameter as to fit slidably but snugly within bore 31. Cam follower end 42 fits slidably through hole 38 in cap 35, and material positioning end 43 of shaft 41 fits slidably but snugly within bore 33.

A coil spring 46 is mounted within bore 31 coaxially with and surrounding material positioning end 43 of shaft 41. The upper end of spring 46 bears upon the under surface 47 of piston 44, and the lower end of spring 46 bears upon the bottom wall 48 of bore 31. Spring 46 is normally in compression and thus bears upon piston 44 to urge shaft 41 upwardly into engagement with a cam 50 suitably positioned axially above member 30. Engagement of the cam follower end 42 of shaft 41 with cam 50 thus determines the longitudinal axial position of material positioning member 40 within cylindrical member 30.

When cut-off die 20 is in either station 21 or 22, its lower surface 34 is in face-to-face sliding engagement with the upper surface of a shear block 55. Shear block 55 has bores 56 and 57 which are positioned so that bore 56 is coaxially aligned with bore 33 of member 30 when die 20 is in station 21, and so that bore 57 is coaxially aligned with bore 33 of member 30 when die 20 is in station 22.

As is evident from FIG. 1, cam member 50 is shaped so as to control the vertical position of material positioning member 41 in member 30. At station 21, the cam member 50 displaces the material positioning member 41 downwardly for almost the full length of member 30, thus filling a major portion of bore 33. At station 22, the cam 50 allows the spring 46 to force positioning member 31 upwardly thus opening an additional length of bore 33. Since cam 50 does not extend over stations 23 and 24, there is no external restriction to the vertical movement of positioning member 41 and thus spring 46 forces piston 44 against the underside of cap 35. In the embodiment of FIG. 1, the desired contact is bimetallic, and no function is performed at station 23 (step C). It will be understood, however, that a third wire segment could be fed into a wire-receiving bore at this point.

At station 24, cut-off die 20 is in coaxial alignment with a header die designated generally by numeral 60 which also is mounted in a revolving die holder (not shown) and, similar to cut-off die 20, is also one of four identical header dies mounted in the revolving die holder. Header die 60 has four material working stations 61, 62, 63 and 64 corresponding to method steps D, E, F and G respectively. Movement of header die 60 from working station 61 through 64 and then back to station 61 corresponds to a complete rotation of the revolving die holder in which the header dies are mounted. The complete relationship of the header die structure to an overall contact forming apparatus for performing the method of the present invention will be discussed in detail hereinafter.

The header die 60, as shown for purposes of illustration, comprises a generally cylindrical die body 71 having a longitudinal, axially extending contact head forming bore 73 in its top end, a longitudinally extending limit plunger bore 74 at its bottom end coaxial with the head forming bore 73, and a contact stem forming bore 75 extending longitudinally axially within die body 17 from bore 73 to bore 74 and coaxially therewith. A limit plunger 72 comprising a lower cylindrical portion 76 and an upper cylindrical portion 77 is slidably mounted within die body 71. The diameter of lower cylindrical portion 76 is slightly smaller than bore 74 so as to allow snug sliding engagement therebetween The upper cylindrical portion 77 of plunger 72 is of a diameter to fit snugly and slidably within bore 75. As can be seen from FIG. 1, cylindrical portions 76 and 77 of plunger 72 are connected by a beveled portion 78 which conforms to a corresponding beveled portion 79 which extends between bores 74 and 75 of plunger 72.

In the illustrated embodiment, as header die 60 is moved from station 61 to station 64 in the contact forming process, plunger 72 is moved progressively inwardly of die 71. As plunger 72 is moved inwardly, upper cylindrical portion 77 thereof occupies progressively more of the volume of bore 75 thus shortening the depth of the stem portion of the contact forming chamber in die 71. By controlling the movement of plunger 72 between the several forming steps, the ratio between shank length and head thickness, and the ratio between shank diameter and head diameter, can be effectively controlled; heretofore this has not been possible.

Over station 24 of cut-off die 20 which corresponds and is in alignment with station 61 of header die 60 there is provided a forming or coning hammer 65 which is positioned to deliver a longitudinally directed axial blow to the cam follower end of material positioning member 40 for purposes to be hereinafter described. Similarly, there is provided above header die 60 in each of stations 62, 63 and 64, heading punches 66, 67 and 68 respectively. The heading punches are mounted by means to be more fully described for vertical reciprocation over the header die 60. The forming punches 66, 67, 68 are provided with concave lower surfaces 80, 81 and 82, respectively, the degree of concavity increasing from surface 80 through surface 82 so as to progressively form the contacting face of the contact to the desired configuration. Of course, other configurations can be employed as desired.

Considering now the individual steps A through G of the method of the present invention, and referring specifically to step A, a wire 14 of material suitable for use as a working contact surface, for example, silver, is forced or fed by a suitable means (not shown) through the bore 56 of shear block 55 into cutoff die bore 33 until it abuts the end of material positioning stem 43. It is to be noted that the amount of contact surface material admitted to bore 33 is dictated by the position of stem 43 which in turn is dictated by the position of cam 50. Thus, depending upon the particular size and type of contact to be formed, stem 43 will be positioned in bore 33 to define a volume equal to the volume of contact surface material desired. When wire 14 is fully inserted into bore 33, cut-off die 20 is rotated with the revolving die holder (not shown in FIG. 1) across shear block 55 thus cutting wire 14 at the interface 34 of cut-off die 20 and shear block 55. At station B, a second wire 15 of suitable material for forming the body portion of a contact, such as copper, is forced or fed by a suitable means (not shown in FIG. 1) through the bore 57 of shear block 55 into cut-off die bore 33 so as to abut the previously cut length of silver 14 and advance the length of silver further inwardly of the bore until it comes into engagement for a second time with stem 43. As is evident from FIG. 1, stem 43 is displaced vertically by the action of spring 46 against piston 44 since the contour of cam 50 allows upward vertical movement of shaft 41 as cut-off die 20 moves from station A to station B. The amount of contact body material admitted to bore 33 is determined by the amount of vertical displacement of shaft 41 and may be varied as required by the characteristics of the contact to be manufactured.

Upon complete insertion of body material wire 15 into cut-off die bore 33, cut-off die 20 is rotated with the revolving die holder (not shown in FIG. 1) across shear block 55, thus cutting wire 15 at the interface of cut-off die 20 and shear block 55. Thus, in station C, the component material elements, wire portion 14 and wire portion 15 are in position in bore 33. No particular function is disclosed for cut-off die 20 at station C, but is to be recognized that an additional wire segment could be fed at this point, or a coning operation of the type to be described with regard to station D could be accomplished. In the preferred apparatus described hereinbelow, for example, the positions of stations C and D are reversed.

At station D of cut-off die 20, which is directly over and corresponds to station 61 of header die 60, shaft 41 is subjected to a blow from a coning hammer 65, which displaces shaft 41 downwardly against the force of spring 46 and forces the contact forming material elements from bore 33 of cut-off die 20 into the head forming bore 73 and stem forming bore 75 of header die 60. The passage of material into the bores of header die 60 is limited by the position of the upper cylindrical portion 77 of the limit plunger 72. The force of the blow from forming hammer 65 through shaft 41 is such as to not only eject the contact forming components from bore 33, but also to deform and simultaneously cold bond them together as they are forced against the confining inner walls of bores 73 and 75 of header die 60.

Figures 2A, 2B, 2C, 3:
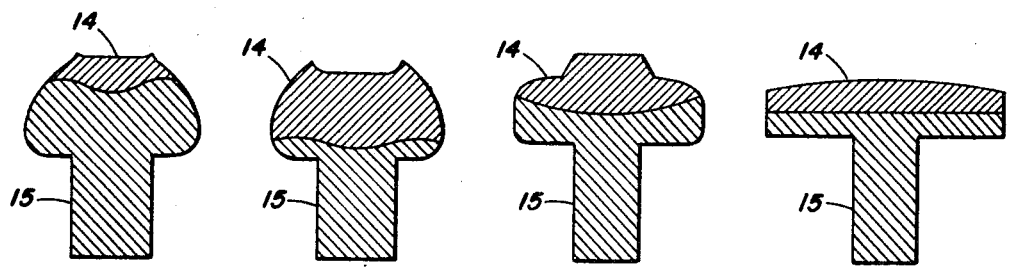
FIG. 3 is a cross-sectional elevation of a composite contact after the final heading step of the invention.

The actual shape of three coned rivets from stage D are shown in FIGS. 2A, 2B and 2C. The difference between FIG. 2A and 2B is essentially only in the relative amount of silver 14 and copper 15 provided at cut-off stations A and B. The coned shape in FIG. 2C is the result of a double coning blow, and is the general shape produced in the preferred apparatus of the invention described hereinbelow. The limiting amount of deformation that can be accomplished with the device illustrated is controlled by the downward coning pressure which must be applied through the relatively small diameter of shaft 43. The pressure of shaft 43 is the only pressure applied if, as is in some instances is desired, shaft 77 on punch 72 is held stationary In other instances, and in particular the embodiment of FIG. 2C, the force of coning hammer 43 is augmented by a blow from an annular bushing, as hereinafter described.

After the initial coning blow, header die 60 is rotated from station 61 through station 64. At each successive station, limit plunger 72 may be moved upwardly in die 60 toward the final position in station 64 which corresponds to the desired stem depth of contact 17. At each station, i.e., stations 62, 63 and 64, the contact 17 is subjected to a forming blow from punches 66, 67 and 68 respectively. These forming blows cold form the contact into the final configuration desired as well as bonding the face and body materials so as to obtain a strong intermolecular bond therebetween.

One of the important features of the instant invention is the ability to produce contacts having a completely even distribution of silver across the contact; this can not be done on conventional cold heading equipment. Thus, after the initial coning operation (station D) the copper-silver interface is bowed or in some instances almost semicircular, as shown in FIG. 2. After successive forming blows at stations E, F, and G, however, this interface becomes completely flat, as shown in FIG. 3. Depending on the shape of the working face of final punch 68 at station G, the top of the contact may be completely flat, slightly curved (FIG. 3) or be substantially rounded, as shown in FIG. 1.

The entire manufacturing process for each contact should preferably take no longer than 0.3 seconds so as to achieve a production of at least 180 contacts a minute. Preferably, both from a production standpoint and from a bonding efficiency standpoint, the entire forming process should be completed in approximately 0.1 seconds per contact.

While the configuration of the silver-copper interface is of course important, it is the quality of the bond between the two materials which is determinative of contact quality. A significant aspect of the present invention is the improvement in bond quality which takes place between stations E and G. By measurement on cross-sectioned and delaminated contacts, it has been determined that the bonded area between the copper and silver is approximately 80 percent of the interface area after one heading operation, but is increased to over 98 percent after three blows. These observations were confirmed by two types of delamination tests. In the first test, rivet heads (fine silver, commercial purity copper) were squeezed in a vise until delamination started, and reduction in area was measured. Rivets that had only one heading blow withstood only 63.5 percent of the deformation that rivets receiving three blows withstood. With the fine silver replaced by 90% Ag, 10% CdO, rivets receiving three heading blows withstood twice the deformation.

In the second test, a sharp chisel was placed on the peripheral edge of the rivet head at the interface, and it was hit with a 3 pound hammer swung through a 1 foot arc. Out of 12 rivets of each kind, the number which could withstand 10 such blows was recorded. With copper-fine silver rivets, single headed rivets were 57.2 percent as strong as triple headed ones, and with copper — 90% Ag, 10% CdO rivets, the figure was 37.5 percent.

Other advantages which come with increased bond strength are manifest: there is less bimetallic separational action under arcing or severe service conditions, and there is less voltage drop across the interfacial bond.

As shown in FIG. 1, no function is performed at station C, and at station G the last heading blow is received followed by withdrawal of punch 68 and ejection of the finished contact. The latter may be accomplished by upward movement of piston 76, which raises the rivet, in combination with a mechanical wiper or compressed air. It would be possible, of course, to have only three positions on the cut-off die and run it at a different speed than the header die, but there are certain timing advantages in the illustrated arrangement.

The foregoing description of FIG. 1 is intended primarily to illustrate the method of the invention, with a general indication of the means with which it can be carried out.

FIGS. 4 - 9 illustrate a preferred embodiment of a machine for carrying out the method of the invention. The machine comprises two main assemblies: a die assembly including all rotating parts, illustrated in FIGS. 4 and 5, and a punch assembly, illustrated in FIG. 6. The die assembly is rigidly attached to the bed or bolster of a conventional high speed press and the punch assembly is rigidly attached to the ram of said press. All moving parts are contained in the die assembly.

Figure 4:
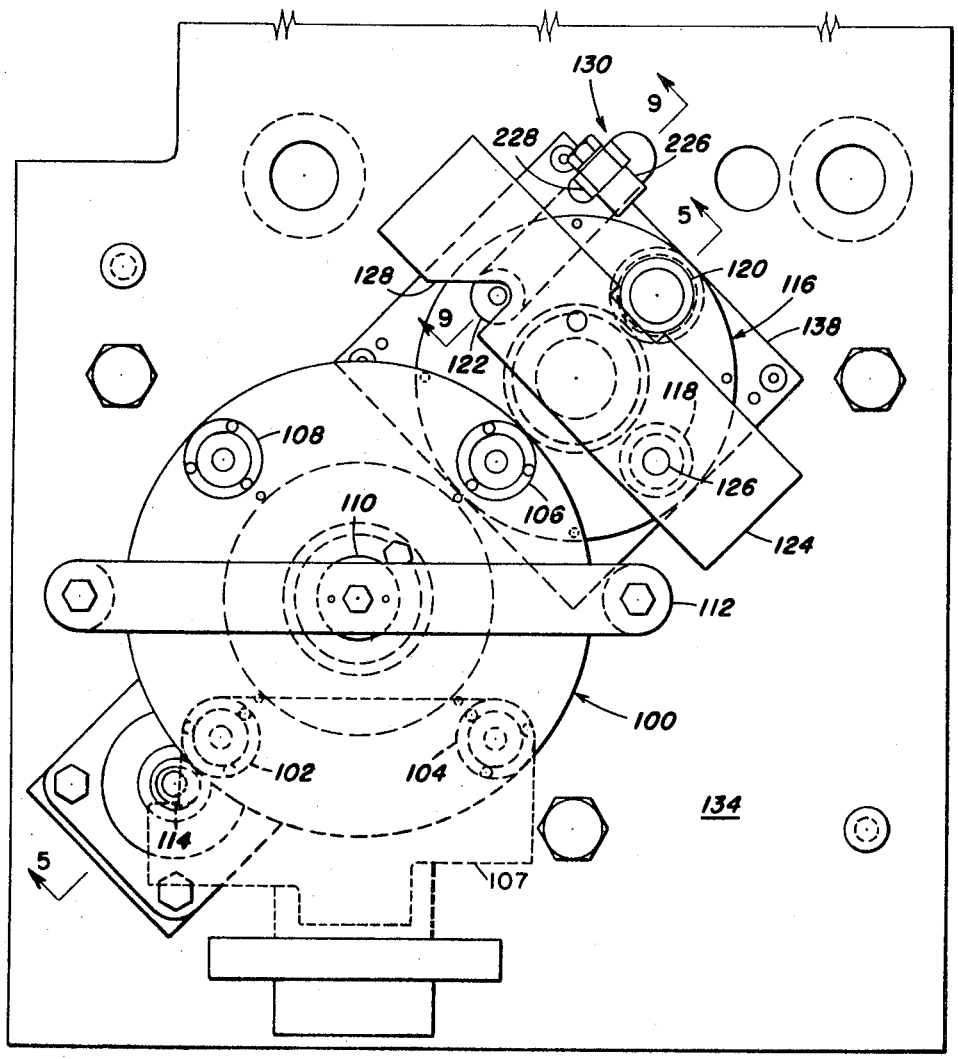
FIG. 4 is a plan view illustrating the upper and lower dial plate assemblies of a preferred embodiment of the invention.

The die assembly is illustrated in FIG. 4. The initial stages of the process are carried out with a rotating upper dial plate 100 having a copper wire shearing station 102, a silver wire shearing station 104 and a coning punch station 106. The general position of the shear assembly (FIGS. 7 and 8) is shown at 107. No function is performed at station 108. Upper dial plate 100 is driven by a central shaft 110 extending downwardly through the bed of the press to a heavy duty indexing drive (not shown) which rotates it in exact 90° increments and brings it to a dead stop at each station. Such indexing drives are commercially available and need not be described herein. The drives can be linked to the main press drive. The upper end of shaft 110 is retained in bridge assembly 112, which is positioned so as not to interfere with any of the working stations. An independently driven cam 114 drives the shear assembly discussed hereinbelow in connection with FIGS. 7 and 8.

Station 106 is common to both upper dial plate 100 and the lower dial plate 116. Lower dial plate 116, in addition to coning station 106, has heading stations 118 and 120, and ejection station 122. Lower dial plate 116 A mounted in a similar fashion to upper dial plate 100; i.e., a downwardly extending central shaft is driven by a second, heavy duty indexing drive, and the upper end of this shaft is retained in a bridge assembly 124. Bridge assembly 124 has an orifice 126 for passage of the first heading punch and a cut-out area to facilitate ejection of finished contacts. The contact ejector is indicated generally at 130, but is more completely described below in connection with FIG. 9. The whole die assembly is retained on a supporting plate 134 bolted to the bed of the press.

Figure 5B:
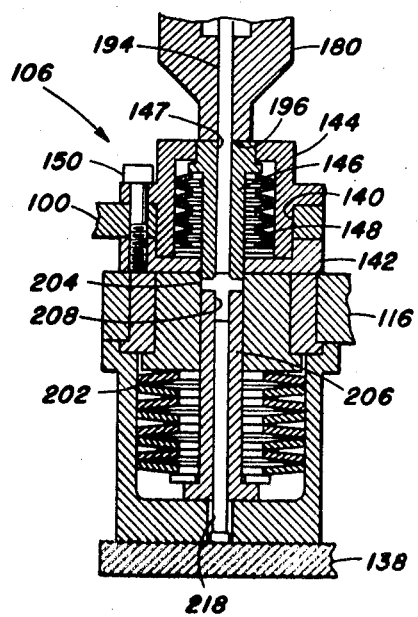
FIG. 5B is a detail view thereof.
Figure 5A:
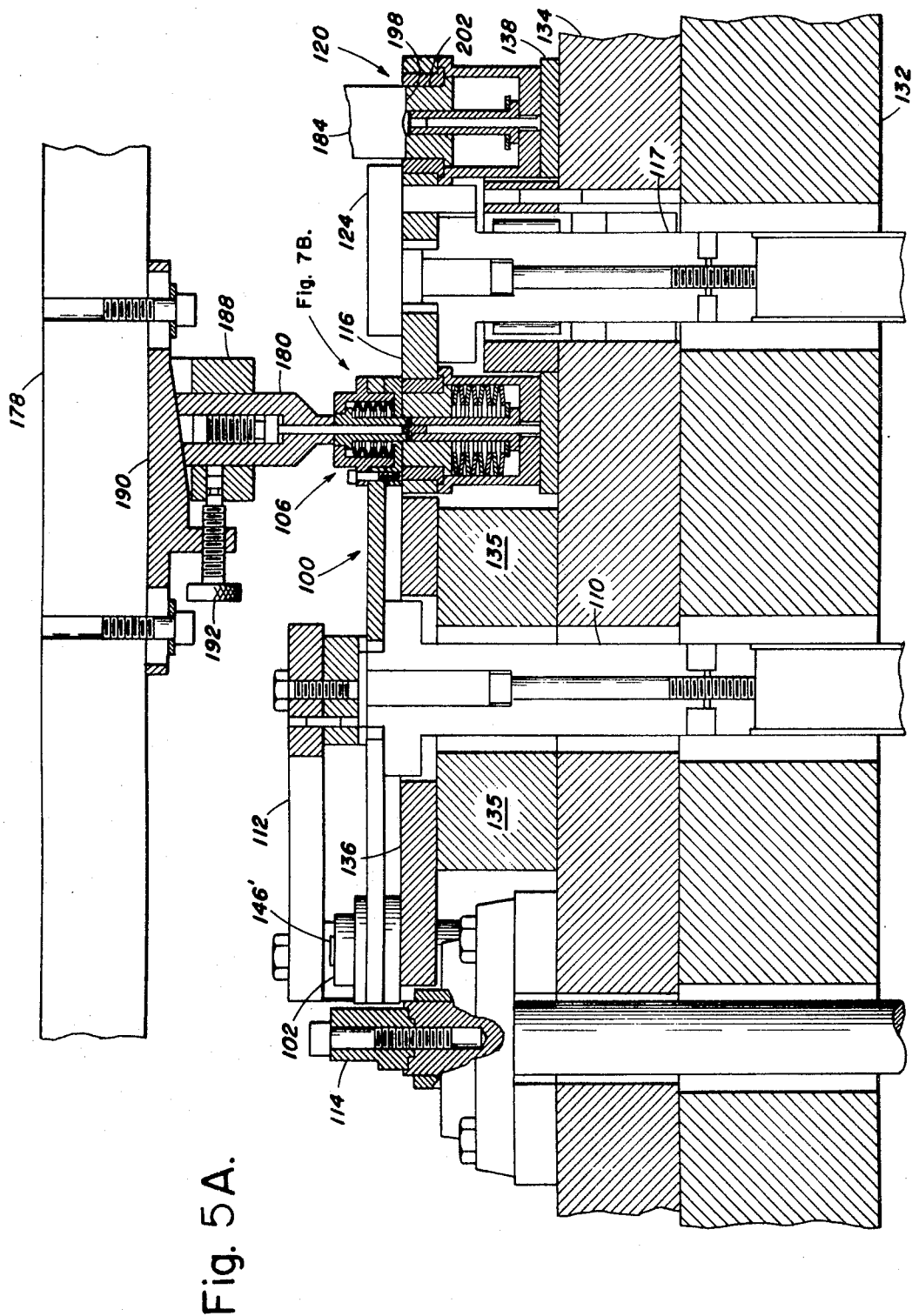
FIG. 5A is a cross-sectional elevation taken along line 5—5 of FIG. 4.
Figure 6:
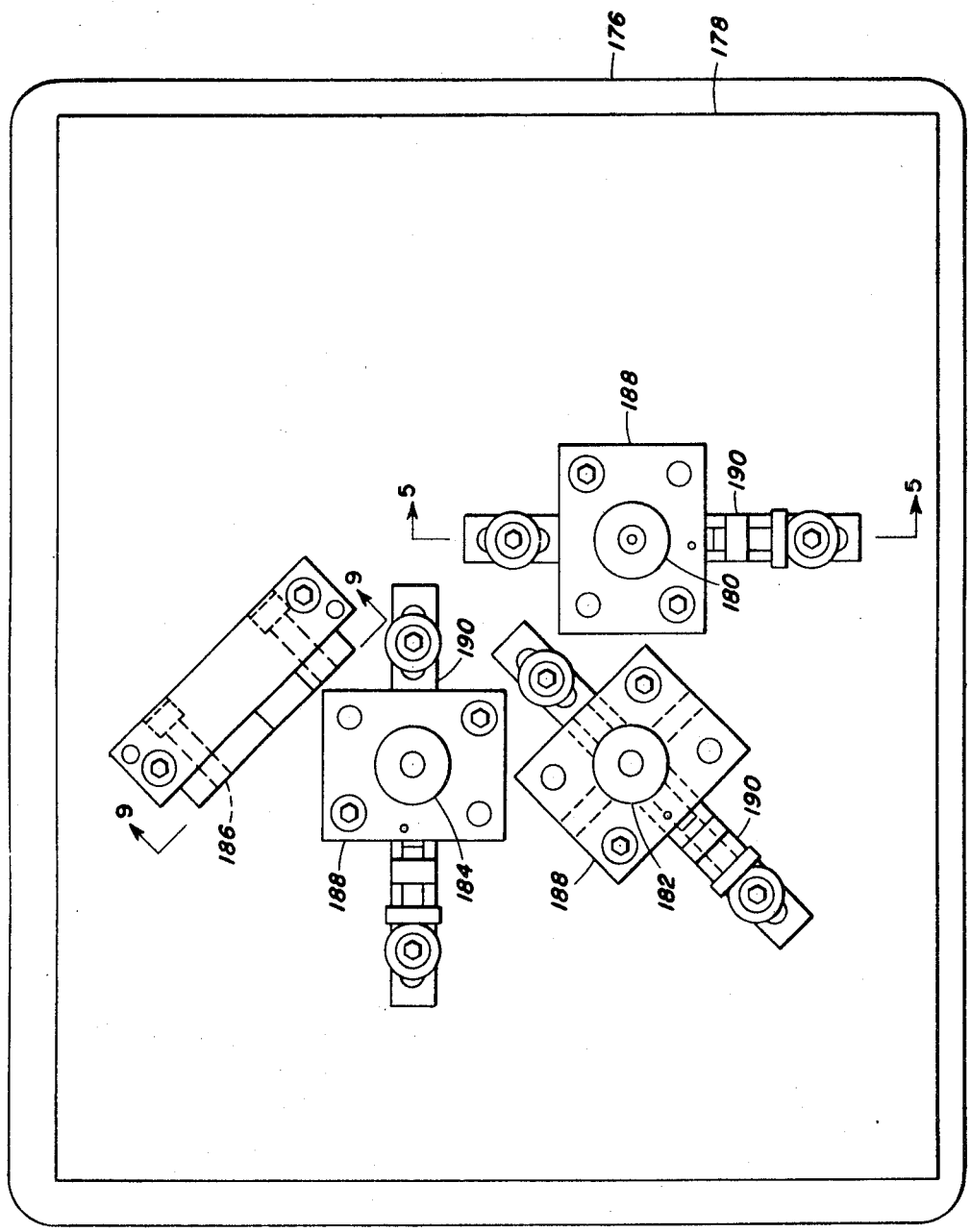
FIG. 6 is a plan view illustrating the position of the various punches and the ejector cam on the ram of the press.

The relative positions of upper and lower dial plates 100, 116 are more clearly shown in FIG. 5A. Upper dial plate 100 is mounted for rotation on its shaft 110 and lower dial plate 116 is mounted on its shaft 117. The press bolster or bed is indicated at 132. As noted above, the entire die assembly is mounted on a support plate 134 bolted to bed 132, and a support block 135 and bearing plate 136 provide support for upper dial plate 100. Block 134 and wear plate 138 provide support for lower dial plate 116.

Upper dial plate 100 is provided with four circular openings 140, one at each of stations 102 — 108, respectively. The structure at each station is identical, and that at station 106 is illustrated in section in FIG. 5B. A lower disk 142 and a bushing retainer 144, the latter passing through opening 140, form an enclosure for a cut-off bushing 146. Bushing 146 has a central wire-receiving bore 147 therein. Screws 150 hold the entire assembly together. As shown in FIG. 5B, bushing 146 is at its lower position, being pressed by the coning punch (described below), but it is ordinarily retained at its upper or raised position by a plurality of belleville washers 148 which act as a spring, biasing bushing 146 in the raised position. In the upper or raised position, the top of bushing 146 extends slightly above the top surface of bushing retainer 144, as shown at 146' at station 102, in FIG. 5A.

It was determined that reliance on the rotating motion of upper dial plate 100 to provide the shearing force to shear the wire segments against a stationary shear block could put an undue strain on the available indexing drives. Consequently, the shear assembly illustrated in FIGS. 7 and 8 is preferred. The shear assembly comprises an arm 152 mounted for rotation about shaft 154 on a suitable supporting block 156. Arm 152 has two bushings 158, 160, each having a bore 162 therein. Bushings 158 and 160 are positioned so that bores 162 are in exact registry with the bore 147 of the upper dial plate assembly at stations 102 and 104, respectively. Arm 152 has attached at one side a cam follower 164 which follows cam 114 (FIG. 4). Two spring-biased plungers 116, 168 attached to an arm 170 (also mounted on support 156) retain arm 152 in the exact registry position except when the assembly is actuated by cam 114. A wire-guiding tube 172 and tube retainer 174 are provided to guide copper and silver wire into bores 162 of bushings 158, 160. It is thus the cam-actuated motion of arm 152 which provides the wire shearing force, rather than the rotation of upper dial plate 100.

The foregoing has described the structure of the upper dial plate and associated shear assembly. Attention will now be directed to the punch assembly, illustrated generally in FIG. 6.

The ram 176 of the press has attached thereto a punch supporting plate 178, which has the following elements on its lower surface: coning punch 180, first heading punch 182, second heading punch 184 and ejector cam 186. These four elements are positioned for exact registry with station 106, 118, 120 and 122 (FIG. 6), respectively. The punches themselves are each mounted on identical punch retainers 188 fastened to a slide block 190 so as to permit fine adjustment of the punch position. It will be understood that either the punch assembly or the die assembly is provided with four guide bars which slide within corresponding bores in the other assembly, so that registration is assured with each ram stroke. This is a common expedient and is not illustrated. The structure of the individual punches is more clearly shown in FIG. 5, and reference is again made thereto; coning punch 180 is illustrated.

The relative positions of punch 180, punch retainer 188 and slide block 190 are clear from the drawing. Fine adjustment is made by means of set screw 192. Coning punch 180 consists of two operative parts: a push-rod 194 and an annular ram 196. Rod 194 extends substantially beyond the face of ram 196 and, in operation extends into bore 147 of cut-off bushing 146, as described more fully below. The construction of heading punches 182 and 184 (FIG. 6) is similar to that of coning punch 180, but they have no central push rod and may be provided with an indentation so as to form the top surface of the contact to a desired configuration. The cross-section of punch 184 is illustrated at 198 in FIG. 5A.

As can be seen from FIGS. 4 and 5, the structure of lower dial plate 116 is similar to upper dial plate 100; it is essentially a round plate with four circular openings. The die cavity assembly in each of these openings is more clearly illustrated in FIG. 9, which also shows ejector mechanism 130, and reference is directed thereto.

A liner 200 is fitted into each opening in lower dial plate 116, and a die cavity bushing 202 having a central bore 204 is slidably engaged therein. The diameter of bore 204 determines the head diameter of the contacts. A sleeve 206 having a central bore 208 slidably fits into bore 204. The size of bore 208 determines the shank diameter of the contacts, and its thickness determines the contact shoulder size. Sleeve 206 has an annular shoulder 210 at its lower end, shoulder 210 serving to support a plurality of belleville washers 212 and form a spring which presses against the lower side of die cavity bushing 202. The whole assembly is retained in position by spring retainer cup 214 and the latter is clamped to the underside of lower dial plate 116 by annular clamp 216 and screws 218. The bottom of spring retainer cup 214 has a central opening 215 coaxial to bore 208 of sleeve 206, but of slightly large diameter. An ejector pin 218 fits slidably in bore 208 and has a shoulder 220 at its lower end which fits slidably in opening 215. During rotation of lower dial plate 116, the bottom of spring retainer cup 214 and the bottom of ejector pin 218 slide on wear plate 138. The relative height of ejector pin 218 in bore 208 determines the length of the shank of the contact. The foregoing die cavity structure is identical at each of stations 106, 118, 120 and 122 of lower dial plate 116.

Figure 9:
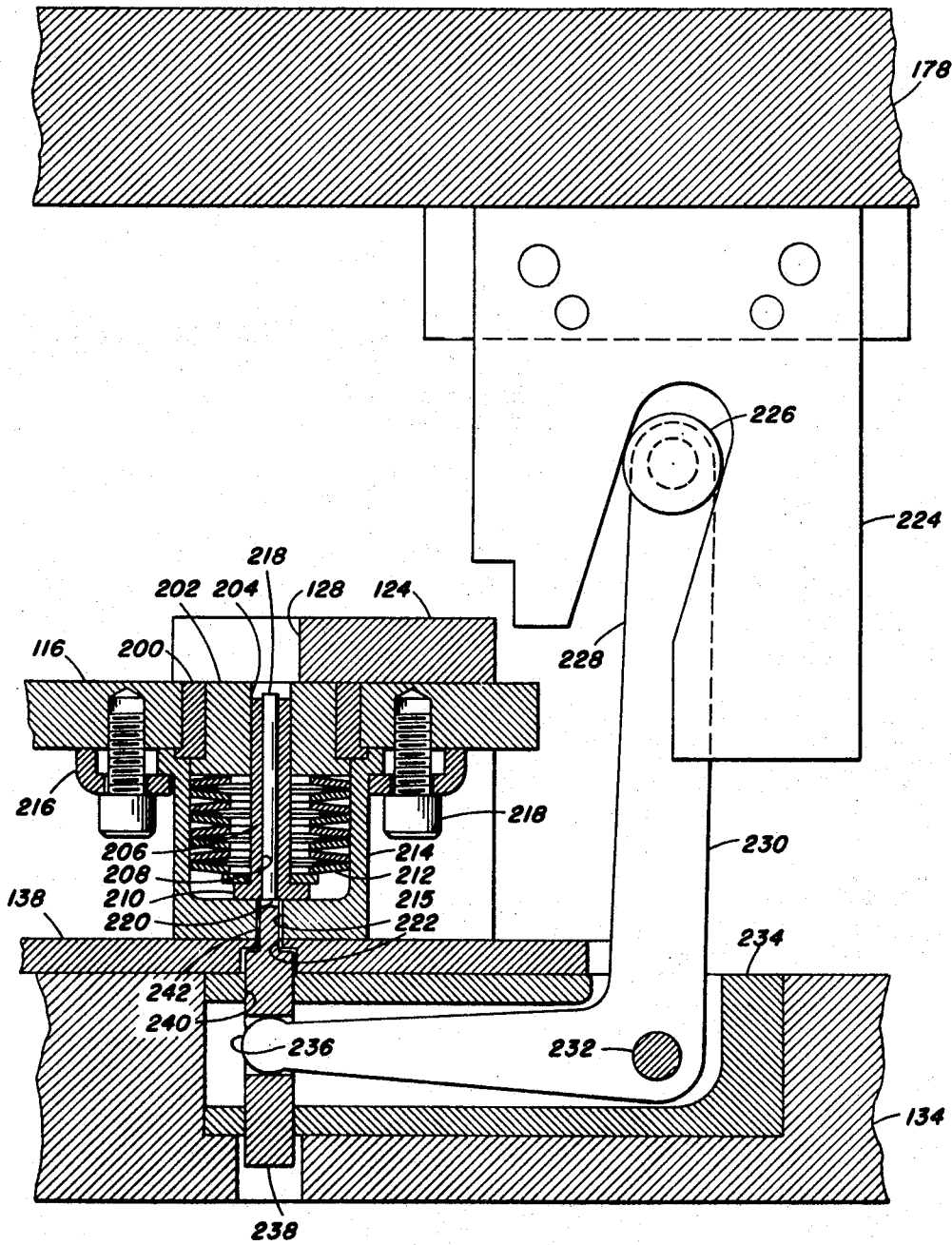
FIG. 9 is a cross-sectional elevation taken along line 9—9 of FIG. 4 illustrating the ejector mechanism of a preferred embodiment of the invention.

Contact ejection takes place at station 122, and the ejector mechanism is also illustrated in FIG. 9. At station 122, a bore 222 in wear plate 138 is in exact registry with opening 215 in spring retainer cup 214. With each stroke of the ram, an ejector cam 224 on the punch assembly (indicated generally at 178 in FIG. 6) engages a cam follower 226 mounted on the upwardly extending end 228 of a rocker arm 230. Rocker arm 230 is mounted for movement on a pivot 232 in a pivot block 234 set in support 134. The opposite end 236 of rocker arm 230 engages a plunger 238 mounted in a bore 240 coaxial with bore 222 in wear plate 138. Plunger 238 has an extension 242 at its upper end which ordinarily slidably fits in bore 222 but, upon actuation of rocker arm 230 by cam 224, extension 242 is raised into opening 215, which in turn lifts ejector pin 218.

The operation of the machine may be described as follows. Reels of copper and silver wire are mounted on or near the top of the press. Two friction-gripping wire feeders (not shown) are mounted on the side of the ram and are set to feed a predetermined length of wire with each ram stroke. Such devices are common in the art. Copper wire is fed through tube 172 into the bore 162 of bushing 158 at station 102. With a stroke of the ram, a precise quantity thereof passes into bore 147 of cut-off bushing 146. Cam 114 then moves arm 152, shearing off the copper wire. Ninety degrees of rotation of upper dial plate 100 brings the copper wire-filled bore to station 104, directly under bushing 160. A precise quantity of silver wire is then fed into the same bore 147, pushing the copper wire further thereinto. Again, movement of arm 152 by cam 114 shears the silver wire.

A further 90° rotation brings the wire filled bore to station 106, as shown in FIG. 5. With the downward stroke of the ram, push-rod 194 enters bore 147 and pushes the wire segments downwardly, first into bore 204 and then into bore 208. The downward pushing continues, and when the bottom of the copper segment meets the top of ejector pin 218, deformation into the die cavity and bonding of the two segments commences. As the ram continues its downward stroke, the lower surface 196 of punch 180 contacts the upper surface of cut-off bushing 146, and pushes it slightly into the die cavity. This results in the coned contact shape illustrated in FIG. 2C. With upward movement of the ram, spring 148 forces bushing 146 back to its normal position. Upper dial plate 100 will then rotate 180° (in two 90° increments) back to station 102 where additional wire is fet. It will of course be understood that the two shear steps and the coning step take place with each 90° rotation of upper dial plate 100.

It has been determined that the double or two-phase coning blow imparted by push rod 196 and the bottom face of annular bushing 146 is substantially superior to the single blow heretofore employed. The two-phase coning blow covers more area than a single blow, and thus produces a better initial bond. In conventional devices, as the wire segments deform into the die cavity and the push-rod enters thereinto, it tends to push into the face-forming metal and leave a rather deep depression. This results in an uneven distribution of face-forming metal which a subsequent heading blow or blows can not correct. In the instant invention, push rod 196 moves to the upper edge of, but not into, die cavity bore 204; the lower end of bushing 146 does move slightly into bore 204, however, resulting in a coned contact as shown in FIG. 2C. Subsequent heading blows produce the contact shape shown in FIG. 3.

The coned contact receives a heading blow from punches 182 and 184 at each of stations 118 and 120. The last heading blow is illustrated in FIG. 5 where the tip 198 of punch 184 is shown contacting the contact and slightly depressing spring-biased bushing 202. At this point the contact is finished. A further 90° of rotation brings the finished contact to ejection station 122.

With the next stroke of the ram, cam 224 on the punch assembly actuates rocker arm 230, plunger 238 lifts ejector pin 218, and the contact is ejected from the die cavity. It is desirable to have a source of compressed air or the like (not shown) at this point to blow the finished contact into a tube or chute for conveyance to a suitable receptacle.

Figure 10:
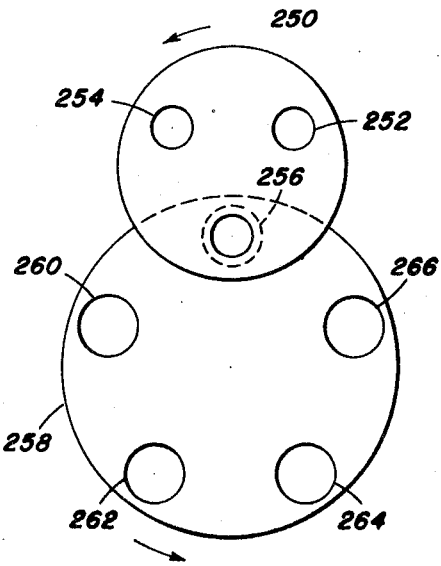
FIG. 10 is a schematic plan view of the upper and lower dial plates of an alternative embodiment of the invention.

It will be noted that the upper and lower dial plates may rotate in the same or opposite directions, but it is convenient to have them rotating in the same direction for ease in synchronizing the respective indexing drives. The drives for the two dial plates of the machine illustrated in FIGS. 6 – 11 are identical in size and function. An alternative embodiment is illustrated in FIG. 10. In this embodiment, the upper dial plate 250 has only three stations, a first wire shear station 252, second wire shear station 254, and coning station 256. The indexing drive therefor rotates plate 250 120° at a time. Lower dial plate 258, on the other hand, has five stations: common coning station 256, three heading stations 260, 262 and 264, and an ejection station 266. The indexing drive for this plate rotates only 72° between stops. While this embodiment requires more elaborate equipment to insure exact registration at station 256, it has the advantages of providing three heading blows and faster transport of the sheared wire to coning station 256.

As noted hereinabove, the apparatus as described has facilities for the feeding of three wire segments rather than two and, with obvious modifications, could handle even more segments. Production of trimetallic contacts, for example silver-copper silver, is advantageous in that, when the rivet is placed in an aperture in a support and the shank portion is deformed to product a second contact face, both face portions will be silver with the body portion being copper. Of course, other metals and alloys can also be used.

It is to be understood that various other changes in the details, steps, materials and arrangements of parts, which have been herein described and illustrated in order to explain the nature of the invention, may be made by those skilled in the art within the principle and scope of the invention, as defined in the appended claims.

What is claimed is:

1. The method for forming, from wire stock, a bimetallic composite contact having an evenly distributed facing portion of a first metal and a body portion of a second metal comprising the steps of:
   severing a length of said first metal from wire stock;
   severing a length of said second metal from wire stock;
   assembling said lengths in end-to-end relation;
   in a die cavity subjecting said assembled lengths to a two-phase axial coning blow to bond said first metal and said second metal at an interface having a larger diameter than said lengths, the first phase of said blow being coaxial to said assembled lengths and acting to initially bond said lengths and commence expansion thereof into said die cavity, and the second phase of said blow being annular to said first phase and acting to further expand the facing portion and part of the body portion into said die cavity to form the head of said contact; and
   subjecting said bonded assembly to at least two axial heading blows to complete formation of said contact and improve said bond.

2. The method as claimed in claim 1, wherein the diameter of said interface after said coning blow is at least 1.5 times the original diameter of said severed lengths.

3. The method as claimed in claim 1, wherein each of said blow exerts a pressure of at least 1 ton per square inch.

4. The method as claimed in claim 1, wherein all of said steps are each completed within less than about 0.1 second, and are repeated so as to produce said contacts at the rate of at least 600 per minute.

5. The method as claimed in claim 1, wherein the first phase of said coning blow extends to the upper edge of said die cavity, and the second phase of said coning blow extends slightly into said die cavity.

6. The method as claimed in claim 1, wherein said die cavity comprises a contact head forming bore and a contact shank forming bore, and the length of said shank forming bore is shortened between each of said coning and heading blows.

7. The method for continuously forming, from wire stock, bimetallic composite contacts having an evenly distributed contact facing portion of a first metal and a body portion of a second metal comprising the steps of:
   a. placing a length of said first metal wire stock in a wire receiving bore located in a rotating wire holder at a first position and shearing said length from said stock;
   b. rotating said wire holder to a second position and placing a length of said second metal wire stock in said wire receiving bore in end-to-end relation with said length of first metal, and shearing said second length from said stock;
   c. rotating said wire holder to a third position and moving said first and second lengths from said wire receiving bore into a header die cavity located in a rotating header die holder, and subjecting same to an axial coning blow to bond said lengths at the interface therebetween and simultaneously form a shank portion and a head portion of enlarged diameter of said contact, said interface being in said head portion, said axial coning blow being delivered in two phases, the first phase being coaxial to and the same diameter as said wire segments and acting to initially bond said segments and commence expansion into said die cavity, and the second phase being annular to said first phase and forming said head portion;

d. rotating said header die holder to at least two successive positions and, at each said position, subjecting said bonded contact to an axial heading blow to form said head and shank portions into a desired configuration and improve the bond at said interface;

e. rotating said header die holder to a still further position and removing the composite contact formed in step (d) from said die cavity; and f. repeating steps (a) through (e) inclusive at a rapid rate, the interval between step (a) and step (c) being in each instance less than 0.5 seconds.

8. The method as claimed in claim 7, wherein said die cavity comprises a contact head forming bore and a contact shank forming bore, and the length of said shank forming bore is shortened between each of said coning and heading blows.

9. The method as claimed in claim 7, wherein step (f) is carried out by employing a plurality of wire receiving bores in said rotating wire holder, and a plurality of die cavities in said rotating header die holder, and each of steps (a) through (e) are carried out simultaneously on different pieces of stock at successive stations, individual pieces of stock being rotated from one station to the next between each step.

10. The method as claimed in claim 7, wherein said contact facing portion is silver, a silver alloy or composite, and said body portion is copper or a copper alloy.

* * * * *